United States Patent
Fowler

(10) Patent No.: US 6,757,018 B1
(45) Date of Patent: Jun. 29, 2004

(54) CMOS IMAGE SENSOR WITH PIXEL LEVEL GAIN CONTROL

(75) Inventor: Boyd Fowler, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/216,699

(22) Filed: Dec. 18, 1998

(51) Int. Cl.$^7$ .......................... H04N 5/235; H04N 3/14; H04N 5/335

(52) U.S. Cl. .................. 348/301; 398/300; 398/294; 398/302; 398/229.1

(58) Field of Search ...................... 348/229.1, 230.1, 348/300, 301, 302, 308, 294; 330/254, 278; 396/99; 341/139, 142, 158; 257/291, 292; 250/288.1

(56) References Cited

U.S. PATENT DOCUMENTS

| | | | | |
|---|---|---|---|---|
| 4,942,474 | A | | 7/1990 | Akimoto et al. ........ 358/213.11 |
| 5,144,447 | A | | 9/1992 | Akimoto et al. ........ 358/213.11 |
| 5,461,425 | A | * | 10/1995 | Fowler et al. .............. 348/294 |
| 5,493,423 | A | | 2/1996 | Hosier ........................ 358/482 |
| 5,539,196 | A | * | 7/1996 | Miyawaki et al. ........ 250/208.1 |
| 5,712,682 | A | * | 1/1998 | Hannah ....................... 348/255 |
| 5,818,052 | A | | 10/1998 | Elabd ...................... 250/370.09 |
| 5,831,258 | A | | 11/1998 | Street ....................... 250/208.1 |
| 5,877,715 | A | * | 3/1999 | Gowda et al. .............. 341/122 |
| 5,923,213 | A | * | 7/1999 | Darthenay et al. ............ 330/51 |
| 5,987,261 | A | * | 11/1999 | Sugahara et al. ............. 396/61 |
| 6,021,172 | A | * | 2/2000 | Fossum et al. ............... 377/60 |
| 6,246,436 | B1 | * | 6/2001 | Lin et al. .................... 348/308 |
| 6,275,259 | B1 | * | 8/2001 | Gowda et al. ............ 348/229.1 |
| 6,320,615 | B1 | * | 11/2001 | Kim ........................ 348/229.1 |

FOREIGN PATENT DOCUMENTS

| | | |
|---|---|---|
| EP | 0626784 A1 | 11/1994 |
| WO | WO95/22180 | 8/1995 |

* cited by examiner

*Primary Examiner*—Wendy R. Garber
*Assistant Examiner*—Justin Misleh

(57) ABSTRACT

An image sensor and method of sensing an image provides a variable amplifier at each pixel, thereby expanding the dynamic range of the sensor. An image sensor core (500) comprises a plurality of pixel sensors (510). Each pixel sensor preferably includes a photosensitive element (310), a variable amplifier (312), and an analog-to-digital converter ("ADC") (314). The ADC (512) includes a comparator (512) coupled to a latch/shift register (514). The comparator (512) receives the output of the variable amplifier (312) and a ramp signal and produces an output when the ramp signal exceeds the amplifier (312) output. The latch/shift register (514) latches a count signal corresponding to the ramp signal when triggered by the comparator (512). In operation, the photosensitive element (310) is exposed to light for a first integration period. The variable amplifier (312) amplifies the resulting photocharge by the maximum possible amount. The ADC (314) converts the photocurrent to a digital signal and latches the five most significant bits in memory (514). These five bits are provided in parallel to the variable amplifier (312) to set the amplification level. Then, the photosensitive element (310) is exposed to light for a second integration period and the resulting photocharge is amplified at the set amplification level. The output of the amplifier (312) is digitized by the ADC (314) and the latch/shift register (514) stores the 12-bit result. The five bits selecting the amplification level and the 12-bit result provide the image sensor with 17 bits of dynamic range.

10 Claims, 4 Drawing Sheets

CMOS IMAGE SENSOR WITH PIXEL LEVEL GAIN CONTROL

BACKGROUND

1. Field of the Invention

This invention pertains generally to an image sensor for converting an optical image into electrical signals and particularly to an image sensor having pixel-level signal amplification and analog-to-digital conversion.

2. Background of the Invention

An image sensor is used to convert an optical image focused on the sensor into electrical signals. The image sensor typically includes an array of light detecting elements, where each element produces a signal corresponding to the intensity of light impinging on that element when an image is focused on the array. These signals may then be used, for example, to display a corresponding image on a monitor or otherwise used to provide information about the optical image.

One goal of an image sensor is to provide the greatest possible dynamic range. Dynamic range specifies, in general, the ratio of the maximum to minimum intensity of light which the image sensor can detect. Dynamic range is typically expressed in decibels (dB), but may also be specified as the bits of precision available from the image sensor where the lowest and highest binary values represented by the bits respectively indicate the dimmest and brightest detectable light and intermediate values correspond to gradations therebetween. An image sensor having a wide dynamic range, for example, can accurately image a scene having widely varying light conditions without suffering from saturation or other sensing defects.

One very common type of image sensor is a charge coupled device ("CCD"). A CCD is typically an array of closely spaced metal-oxide semiconductor ("MOS") capacitors and photodiodes on a solid-state surface. Each photodiode is referred to as a photosite and passes charge in response to the incident light intensity.

For example, FIG. 1 is a block diagram illustrating a prior art CCD image sensor 100. Illustrated are a two-dimensional array of image sensors 110, of which sensor 112 is exemplary. Each vertical array of sensors, of which array 113 is exemplary, is coupled to an input of a vertical CCD shift register, of which shift register 114 is exemplary. The output of each vertical CCD shift register 114 is coupled to an input of a horizontal CCD shift register 116. The output of the horizontal CCD shift register 116 is coupled to an amplifier 118, the output of which is coupled to the input of an analog-to-digital ("A/D") converter 120.

In use, the electric charge of the image sensors 112 in the vertical arrays 113 are shifted in parallel into the respective vertical CCD shift registers 114. Then, one charge packet from each vertical CCD shift register 114 is shifted into the horizontal CCD shift register 116. The charge packets in the horizontal CCD shift register 116 are shifted out one at a time, converted from a charge into a voltage by the amplifier 118, and converted into a series of digital bits by the A/D converter 120.

The dynamic range of a CCD-based image sensor is typically in the range of 8–14 bits. Due to the shared pixel signal path and the off-chip A/D converter 120, it is difficult to further expand the dynamic range of a CCD-based image sensor. In addition, the image signal is susceptible to noise and distortion due to the long analog signal path. Moreover, CCD technology is a relatively small market and has not fully benefited from mass production cost reductions.

Partly in response to the problems with CCD-based image detectors described above, there has recently been renewed interest in complementary-metal-oxide semiconductor ("CMOS")-based imaging. In a CMOS-type image sensor, a photodiode or phototransistor (or other suitable device) is used as the light detecting element, where the conductivity of the element corresponds to the intensity of light impinging on the element. The variable signal thus generated by the light detecting element is an analog signal having a magnitude approximately proportional (within a certain range) to the amount of light impinging on the pixel. CMOS image sensors are formed as an integrated circuit and are generally much less expensive than CCDs.

FIG. 2 is a block diagram illustrating a prior art CMOS image sensor 200. Illustrated is a two-dimensional array of pixel image sensors 210, of which sensor 212 is exemplary. Each image sensor 212 is coupled to an input of a fixed-gain amplifier, of which amplifier 214 is exemplary. The fixed-gain amplifier 214 provides a minimal amount of amplification and primarily acts as a buffer. The output of the fixed gain amplifier 214 is passed through a switch, such as switch 216, and input to an analog multiplexer ("MUX") 218. The outputs of the switches in each vertical array, such as array 221, are coupled to the same input line of the MUX 218 and a row decoder 217 is coupled to each horizontal array of switches, such as array 219. The selected input to the MUX 218 is passed to an output amplifier 220. The output of the output amplifier 220 is passed to an A/D converter 222.

In use, the outputs of the row decoder 217 selectively enable a horizontal array 219 of switches 216, causing the output voltages of the fixed-gain amplifiers 214 in the array 219 to be passed to the inputs of the analog MUX 218. The MUX 218 selectively passes the input voltages to the output amplifier 220 and the A/D converter 222.

However, for large pixel arrays, the analog signals generated by each light detecting element are subject to varying degrees of parasitic effects such as those caused by parasitic capacitances and resistances. These parasitic effects are difficult to control and result in degradation of the signal-to-noise ratio of the image information. Moreover, CMOS-based image sensors typically provide less dynamic range than do CCD-based sensors.

To this end, CMOS-based image sensors such as that disclosed in U.S. Pat. No. 5,461,425 (the "'425 patent") by an inventor of the present invention, which is hereby incorporated by reference herein, have been developed. The CMOS image sensor in the '425 patent resembles that shown in FIG. 2, except that the image sensor of the '425 patent has an A/D converter at each pixel, thereby alleviating the analog parasitic effects of other CMOS image sensor designs.

However, even the CMOS image sensor in the '425 patent provides only eight bits of dynamic range. Accordingly, there is a need in the art for a CMOS-based image sensor providing a greater dynamic range than existing image sensors.

SUMMARY OF THE INVENTION

The above needs are met by an image sensor and method of sensing an image that provides a variable amplifier at each pixel. By individually and variably amplifying the signals from the pixels, one embodiment of the present invention provides 17 bits of dynamic range.

A preferred embodiment of the present invention comprises an image sensor core (500) of a computer chip manufactured using a complementary-metal-oxidesemiconductor ("CMOS") process. The image sensor core comprises an array of image sensing elements (510). Each element includes a photon detector (310), also referred to as a photodetector, a variable amplifier (312), and an analog-to-digital ("A/D") converter (314).

The photon detector (310) is a photosensitive element such as a photodiode and generates photocharge in response to light impinging on the detector (310). The photocharge is amplified by the variable amplifier (312). In one embodiment of the present invention, the amount of amplification provided by the variable amplifier (312) is controllably selected from up to 32 amplification levels by a 5-bit control signal.

The voltage output by the amplifier (312) is provided to the A/D converter (314), which generates a digital value describing the photocurrent. In one embodiment of the present invention, the A/D converter (314) generates a 12-bit value, which is then stored in a memory. Together, the 5-bit amplification level and 12-bit value describe the light impinging on the detector (310) with 17 bits of dynamic range.

The A/D converter (314) preferably comprises a comparator (512) coupled to a 17-bit latch/shift register (514). The comparator (512) receives the output of the variable amplifier (312) and a monotonic ramp signal and has an output coupled to the latch/shift register (514). The latch/shift register (514) receives a 12-bit count signal synchronized to the ramp signal and has a parallel output coupling the five most significant bits of the shift register (514) to the variable amplifier (312) and a serial output through which all 17 bits can be shifted. When the comparator (512) determines that the ramp signal has exceeded the output of the variable amplifier (312), the comparator (512) triggers the latch/shift register (514) and causes the latch/shift register (514) to latch the count signal. The count signal is controllably latched in either the five most significant bits or the 12 least significant bits of the shift register (514). The five most significant bits latched into the shift register (514) form the control signal for the variable amplifier (312).

The present invention preferably uses a two phase method to provide 17 bits of dynamic range. During the first phase, the photosensitive element (310) is exposed to light for a first integration period. In a preferred embodiment of the present invention, the first integration period is $\frac{1}{32}^{nd}$ of the normal integration period. The variable amplifier (312) amplifies the resulting photocharge at the maximum amplification setting. Then, the amplified photocurrent is converted from analog to digital by the A/D converter (314). During the conversion, the ramp signal is increased 32 times faster than normal and the five most significant bits of the count signal are latched into the five most significant bits of the 17-bit latch/shift register (514).

During the second phase, the photosensitive element (310) is exposed to light for the normal integration period. Then, the variable amplifier (312) amplifies the resulting photocharge by an amount determined from the five bits latched into the latch/shift register (514). The resulting photocurrent is passed to the A/D converter (314) and the corresponding 12-bit count signal is latched in the 12 least significant bits of the latch/shift register (514).

At the end of the second phase, the entire 17-bit content of the latch/shift register (514) can be serially shifted out. The five most significant bits describe the exponent and the 12 least significant bits describe the mantissa of the digital value corresponding to the intensity of light impinging on the sensor element during the integration period. Accordingly, the dynamic range of the image sensor according to the present invention has 17 bits of precision.

DETAILED DESCRIPTION OF THE PREFERRED EMBODIMENTS

Figure 1:
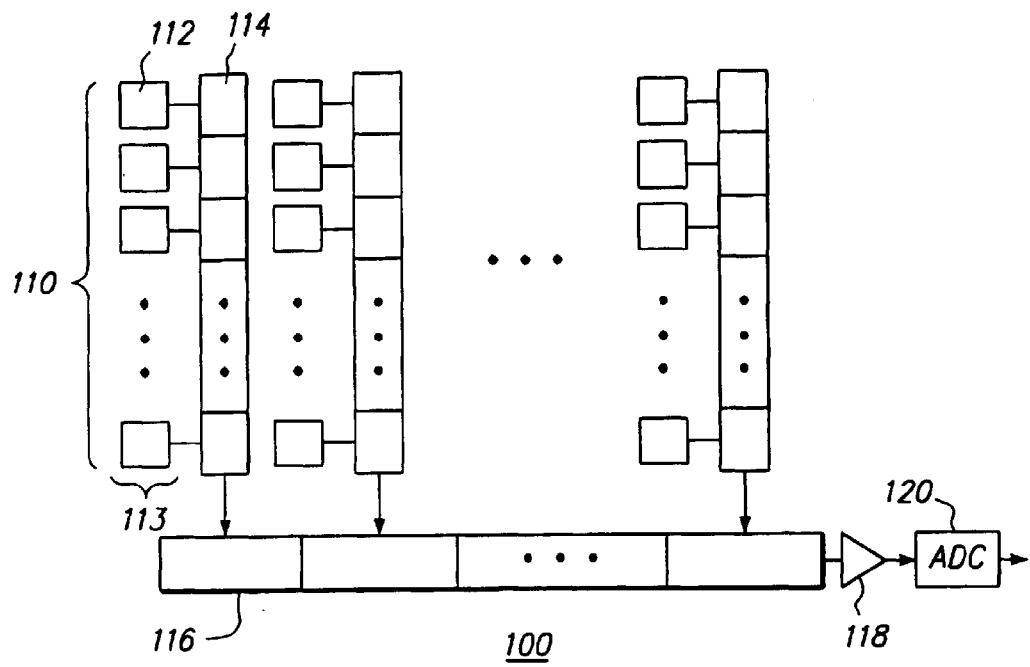
FIG. 1 is a block diagram illustrating a prior art CCD image sensor.
Figure 2:
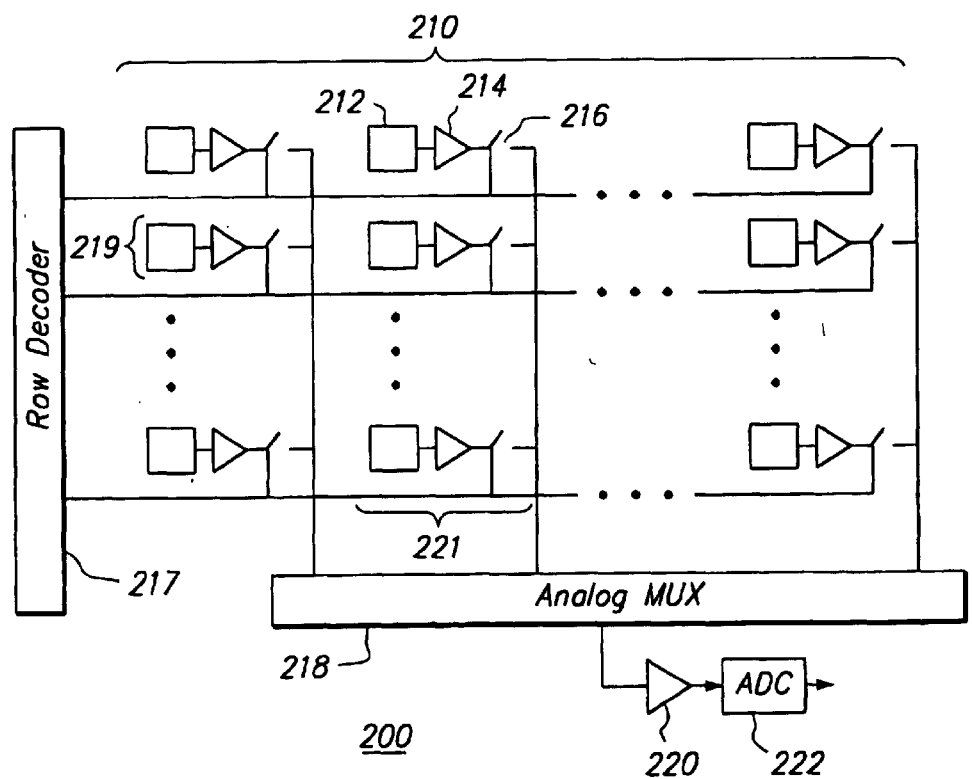
FIG. 2 is a block diagram illustrating a prior art CMOS image sensor.
Figure 3:
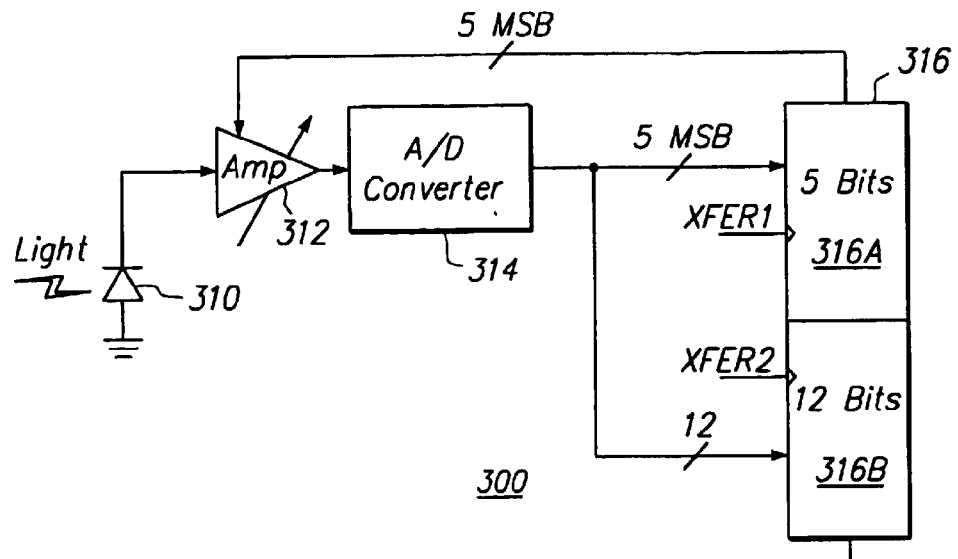
FIG. 3 is a block diagram illustrating a single pixel of a CMOS-based image sensor according to a preferred embodiment of the present invention.

FIG. 3 is a block diagram illustrating a single pixel of a complementary-metal-oxide semiconductor ("CMOS")-based image sensor 300 according to a preferred embodiment of the present invention. FIG. 3 illustrates a photon detector 310 coupled to a variable amplifier 312. The photon detector 310 is preferably a photodiode. However, any CMOS-based photosensitive element may be substituted if suitable adjustments are made to the sensor. As is well known in the art, the photocurrent flowing through the photodiode is proportional to the amount of light energy incident on the PN junction of the photodiode.

The photocurrent is input to the variable amplifier 312. Preferably, the amplifier 312 is a transresistance amplifier with digitally programmable feedback capacitance. The gain of the amplifier 312 is preferably steppable in powers of two and preferably receives a 5-bit input describing the exponent of the gain. The output of the amplifier 312 passes to an A/D converter 314.

The A/D converter 314 converts the analog voltage received from the amplifier 312 into a representative digital value and is preferably a 12-bit single slope level converter. The A/D converter 314 preferably includes a sample and hold circuit, an auto zeroed comparator, and a gray to binary code converter circuit. The operation of the A/D converter 314 is described in more detail below.

The five most significant bits of the A/D converter's 314 output are preferably coupled to five bits 316A of a 17-bit shift register 316. The five bits 316A of the shift register 316 are coupled in parallel to the variable amplifier 312. As described above, the variable amplifier 312 uses the 5-bit value to determine the gain setting. In addition, all 12 bits of the A/D converter's 314 output are coupled to the other 12 bits 316B of the shift register 316. Two control signals, XFER1 and XFER2, respectively control whether data is loaded into the 5-bit 316A or the 12-bit 316B portion of the shift register 316. The shift register 316 has a 1-bit output through which all 17 bits of data can be serially shifted. Although a preferred embodiment of the present invention uses a 17-bit shift register having 5-bit and 12-bit portions, it is important to note that alternative embodiments of the present invention can use a memory storing any practical number of bits. Thus, embodiments using greater or fewer numbers of bits to represent gain settings and light intensity values are clearly within the scope of the present invention. In addition, the relative positions of the two data portions within the shift register 316 can vary.

The operation of the image sensor of FIG. 3 can be described as two sequential phases. The first phase determines the proper gain for the pixel. The second phase determines the output voltage of the pixel. The gain and output voltage are combined using scientific notation into a single binary value describing the intensity of light impinging the pixel, where the gain setting is the exponent and the output voltage is the mantissa.

The gain setting for the pixel is measured by setting the amplifier 312 to the maximum gain setting and exposing the pixel to a fixed amount of light for a shortened integration period. Since the amplifier 312 is initially set to the maximum gain of $2^5=32$ gain settings, the shortened integration period is preferably $\frac{1}{32}^{nd}$ of the normal integration period of 4.7 ms. Other initial gain settings and integration periods may be utilized in alternative embodiments.

The resulting photocurrent is passed to the A/D converter 314. The A/D converter 314 performs a 12-bit A/D conversion on the photocharge, and the five most significant bits of the result are stored in the five bits 316A of the shift register 316 that are coupled to the amplifier 312, thereby setting the gain of the variable amplifier 312 for the second phase.

At the beginning of the second phase, determining the output voltage at the pixel, photocharge is integrated on the variable amplifier 312 for the normal integration period. At the end of the integration period, the output voltage from the amplifier 312 is converted from an analog to a digital signal using the 12 bits of resolution provided by the A/D converter 314. The 12-bit output is passed to the 12-bit portion 316B of the shift register 316. At the end of the second phase, the 17 bits of pixel data can be serially read from the shift register 316. Five bits of the data specify the pixel gain (the exponent) and 12 bits specify the output voltage of the pixel (the mantissa).

Figure 4:
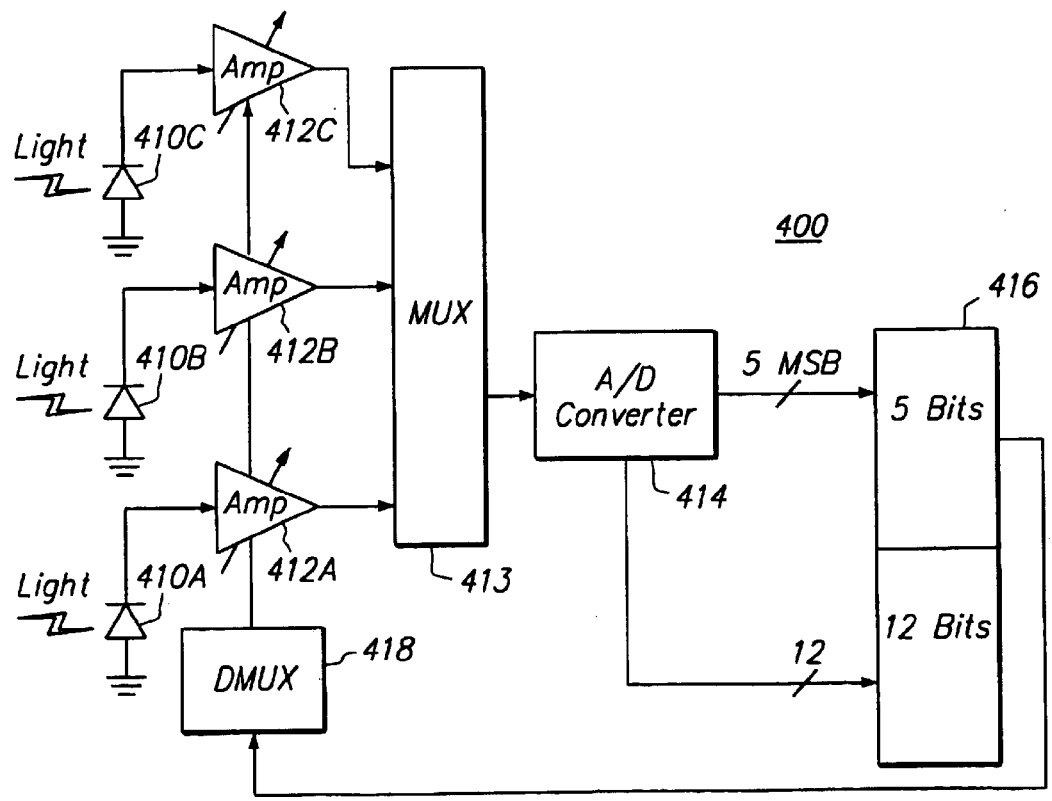
FIG. 4 is a block diagram illustrating a plurality of pixels of a CMOS-based image sensor according to an alternative embodiment of the present invention.

FIG. 4 illustrates an alternative embodiment of an image sensor 400 according to the present invention. In this embodiment, multiple photon detector 410A–C/variable amplifier 412A–C pairs are coupled to a multiplexer ("MUX") 413. The MUX 413 selects which amplifier 412 output is passed to the A/D converter 414. Likewise, a demultiplexer ("DMUX") 418 selects which variable amplifier 412 receives the 5-bit gain setting data held in the shift register 416. This embodiment may reduce the complexity of a CMOS sensor chip over a chip using the embodiment illustrated in FIG. 3 by reducing the number of A/D converters.

In one implementation of this embodiment, the image sensor 400 uses the MUX 413 and the DMUX 418 to collect the 17-bit data from each photon detector 410 in a serial fashion. Other methods of operating the image sensor 400 are readily apparent to those skilled in the art. For example, if the group of photon detectors 410 coupled to a particular A/D converter 414 are geographically proximate, it may be adequate to use a single gain setting for the amplifiers 412 in the group.

Figure 5:
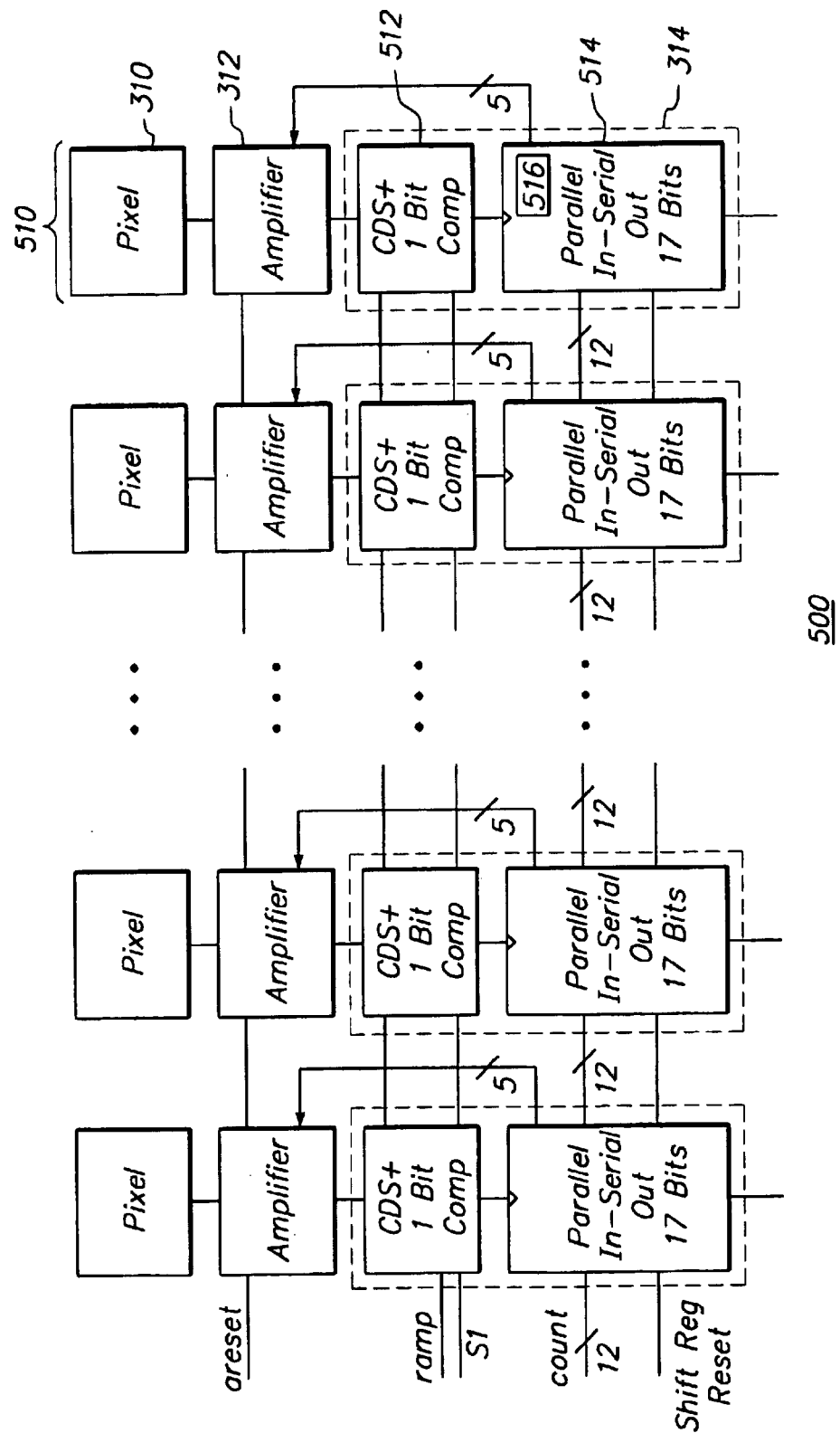
FIG. 5 is a high-level block diagram of an image sensor chip having a plurality of pixel sensors according to the present invention.

FIG. 5 is a high-level block diagram of a CMOS image sensor chip according to a preferred embodiment of the present invention. The image sensor core 500 of the chip preferably comprises a plurality of pixel sensors, of which pixel sensor 510 is representative. Although only four pixel sensors are illustrated in FIG. 5, an embodiment of the image sensor core 500 can have many pixel sensors, aligned in either a one- or two-dimensional array. In one embodiment of the present invention, the image sensor core 500 has 2700 pixel sensors arranged in a one-dimensional array. Each pixel sensor 510 is functionally equivalent to the sensor illustrated in FIG. 3 and contains a photon detector 310, an amplifier 312, and an A/D converter 314.

In operation, an image is focused on the image sensor core 500 such that a different portion of the focused image impinges on each pixel sensor 510. The photocharge generated by each photon detector 310 thus corresponds to the intensity of light impinging on the photon detector 310. The analog signals from all of the pixel sensors 510 in the core 500 are simultaneously and variably amplified and converted into serial bit streams according to the two phase process described above. The serial bit streams can then be processed to derive a signal representative of the intensity of light impinging on the photon detector 310.

As shown in FIG. 5, the A/D converter 314 is comprised of a one bit comparator 512 having a sample and hold circuit using correlated double sampling ("CDS") for receiving the photocurrent from the amplifier 312. The comparator 512 has two control inputs, respectively receiving the signals "S1" and "ramp." The S1 signal causes the comparator 512 to hold the output voltage from the amplifier 312. When the voltage of the ramp signal exceeds the sampled output voltage, the output of the comparator 512 switches from high to low.

The A/D converter 314 also comprises a 17-bit latch/shift register 514 receiving the output of the comparator 512 and performing the function of the 17-bit shift register shown in FIG. 3. The latch/shift register 514 receives a 12-bit input "count" preferably containing an incrementing gray coded count synchronized with the ramp signal, a 1-bit input "shift register reset" that zeroes the contents of the latch/shift register 514, and preferably has a 1-bit output through which its contents can be shifted. The latch/shift register 514 also has a 5-bit output coupled to an input of the amplifier 312.

The A/D converter also preferably comprises a 5-bit gray to binary code converter circuit 516. This circuit 516 preferably converts the 5-bit gray coded exponent signal captured by the latch/shift register 514 into a binary control signal for the variable amplifier 512.

Figure 6:
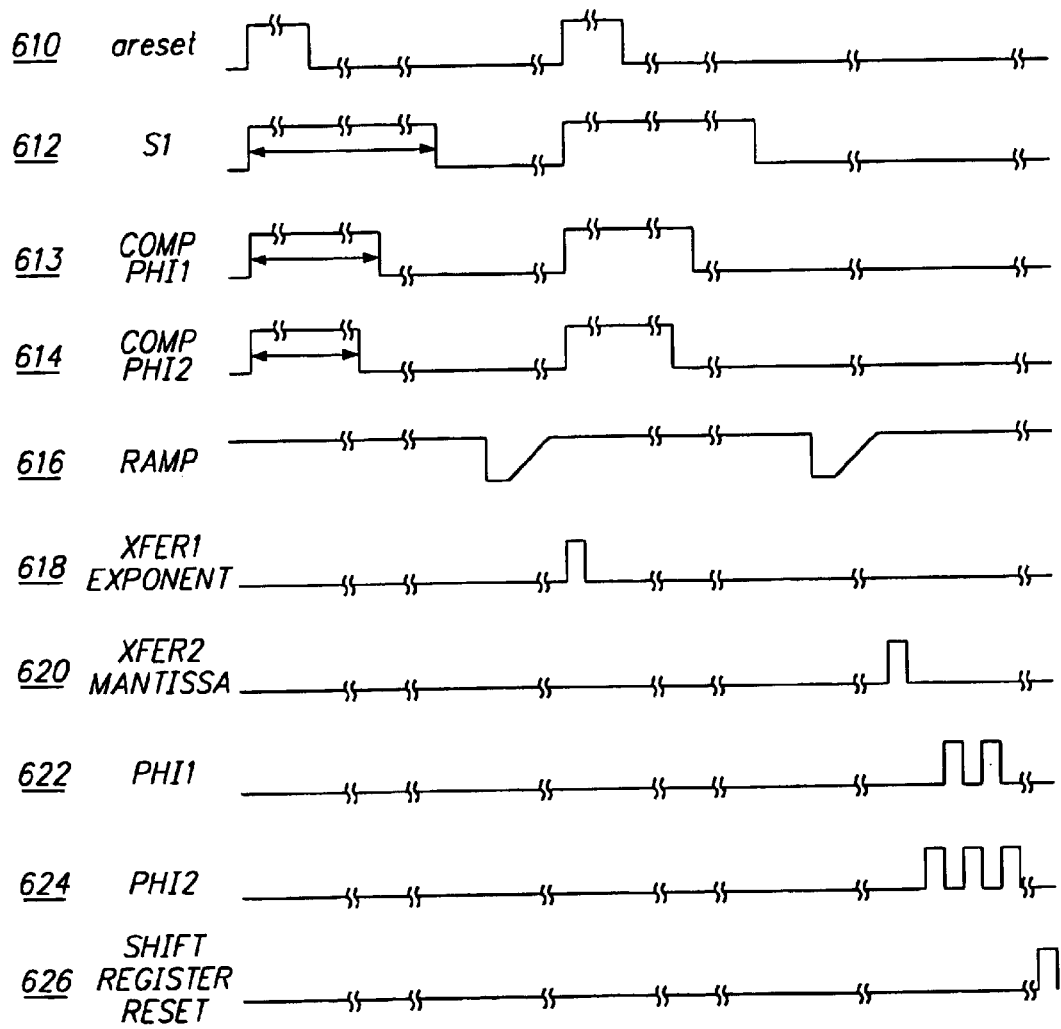
FIG. 6 is a timing chart illustrating the operation of the image sensor chip of FIG. 5 when performing two-phase image sensing.

FIG. 6 is a timing chart illustrating the operation of the image sensor chip of FIG. 5 (and the embodiment illustrated in FIG. 3) when performing the two-phase image sensing described above. FIG. 6 illustrates the signals areset 610, S1 612, comp. PHI1 613, comp. PHI2 614, ramp 616, XFER1 618, XFER2 620, PHI1 622, PHI2 624, and shift register reset 626. Control signal 616 is preferably analog while the other signals are preferably digital.

At the beginning of the first phase, areset 610 pulses high, which resets the pixel amplifiers 312 to the highest gain setting. At substantially the same time, the comparators 512 are autozeroed. After areset falls, each pixel amplifier 310 is allowed to settle and the reset voltage from each pixel is sampled into each respective comparator 512. The comparators 512 use the comp. PHI1 613 and comp. PHI2 614 signals to perform offset compensation/CDS. While comp. PHI1 613 is high, the analog reset voltage from the pixel amplifier 312 and the offset of the first stage of the comparator 512 are sampled. Then, while comp. PHI2 614 is high, the offsets are automatically subtracted from the pixel amplifier 310 output sample.

At substantially the same time areset 610 goes high, S1 612 also goes high to mark the beginning of the integration period. Since this is the first phase, the integration period is preferably $1/32^{nd}$ of the normal integration period of 4.7 ms. At the end of the integration period, S1 612 falls and causes the comparator 512 to sample the output voltage of the pixel amplifier 312.

After a sample-to-ramp reset time, which in one embodiment is 100 ns, the ramp reset signal pulses high and causes the ramp signal 616 to go low. In a preferred embodiment of the present invention, the ramp signal 616 rises monotonically over a period of time. However, any monotonic waveform can be used instead of the ramp signal. Since this is the first phase, in one embodiment the ramp signal 616 rises from minimum to maximum in $1/32^{n*}$ of the normal ramp time of 0.5 ms. As the ramp signal 616 rises, the 12-bit gray coded count on the count input to the latch/shift register increases. When the ramp signal exceeds the sampled output voltage of the pixel amplifier 312, the XFER1 signal 618 is triggered, which causes a gray code on the count input to the latch/shift register 514 to be transferred to the 5bit portion 316A of the latch/shift register 514. The binary equivalent of the transferred five bits are converted to binary and sets the gain level of the variable amplifier 512.

At the beginning of the second phase, areset 610 again pulses high and this time sets the pixel amplifiers 312 to the gain level specified by the five bits held in the latch/shift register 514. In addition, the comparators 512 are autozeroed and the comp. PHI1 613 and comp. PHI2 614 signals perform offset compensation/CDS. At substantially the same time, signal S1 612 again rises and this time stays high for the normal integration period.

After the sample-to-ramp reset time, the ramp reset signal 614 again pulses high and causes the ramp signal 616 to go low. Then, the ramp signal gradually rises and the 12-bit count signal correspondingly increases. Since this is the second phase, in one embodiment the ramp signal rises from minimum to maximum in 0.5 ms. When the ramp signal exceeds the sampled output voltage of the pixel amplifier 312, the XFER2 signal 620 is triggered, which causes the gray code on the count input to the latch/shift register 514 to be transferred to the 12-bit portion 316B of the latch/shift register 514.

After the second phase, the latch/shift register 514 contains the 5-bit exponent and the 12-bit mantissa representing the intensity of light impinging on the pixel sensor 310. Next, a series of pulses on PHI1 622 and PHI2 624, the two phase clock for the shift register, shift the latched data out of the latch/shift register 514. Although only a few pulses are shown, in a preferred embodiment 17 shifts are needed to read all of the data. Once the data in the shift register has been read, the contents of the shift register are reset by a pulse on the shift register reset signal 626.

Together, the 5-bit exponent and the 12-bit mantissa shifted out of the latch/shift register 514 represent the intensity of the light incident on the pixel 310 with 17 bits of precision. Accordingly, the dynamic range of the pixel sensor 300, or the ratio of the maximum to minimum intensity of light which a pixel sensor can detect, is much greater than a traditional image sensor.

I claim:

1. An image sensor circuit comprising:
    an array of photon detectors located within an image sensor core on an integrated circuit chip, each photon detector for generating a signal responsive to light impinging upon the photon detector;
    a plurality of variable amplifiers located within the image sensor core, each variable amplifier coupled to at least one of the photon detectors, for variably amplifying the signal from the coupled photon detector, each variable amplifier having a gain that depends on the signal generated by the photon detector coupled to that variable amplifier; and
    a plurality of analog-to-digital converters located within the image sensor core, each analog-to-digital converter coupled to at least one of the plurality of variable amplifiers, for converting the amplified signal from the coupled variable amplifier into a digital representation of the signal.

2. The image sensor circuit of claim 1, wherein the digital representation of the signal from each analog-to-digital converter comprises:
    a control signal for determining an amount by which the coupled variable amplifier amplifies the signal.

3. The image sensor circuit of claim 2, wherein each of the plurality of analog-to-digital converters comprises:
    a memory for storing the digital representation of the signal.

4. An image sensor circuit comprising:
    an array of photon detectors located within an image sensor core on an integrated circuit chip, each photon detector for generating a signal responsive to light impinging upon the photon detector;
    a plurality of variable amplifiers located within the image sensor core, each variable amplifier coupled to at least one of the photon detectors, for variably amplifying the signal from the coupled photon detector; and
    a plurality of analog-to-digital converters located within the image sensor core, each analog-to-digital converter coupled to at least one of the plurality of variable amplifiers, for converting the amplified signal from the coupled variable amplifier into a digital representation of the signal,
    wherein the digital representation of the signal from each analog-to-digital converter comprises a control signal for determining an amount by which the coupled variable amplifier amplifies the signal, and wherein each of the plurality of analog-to-digital converters comprises a memory for storing the digital representation of the signal, and wherein the memory comprises:
    a first output for outputting the control signal to the coupled valuable amplifier, and a second output for outputting the digital representation of the signal.

5. A method of generating electrical signals describing an optical image, comprising the steps of:
    generating a first signal corresponding to light impinging on a sensor element;
    amplifying the first signal by a first amplification level to produce a first amplified signal;
    determining a second amplification level from the first amplified signal;
    generating a second signal corresponding to light impinging on the sensor element;
    amplifying the second signal by the second amplification level to produce a second amplified signal,
    determining a digital value describing the optical image from the second amplified signal and the second amplification level,
    wherein the step of determining a second amplification level from the first amplified signal comprises the steps of:
    converting the first amplified signal into a first digital representation; and storing at least a portion of the first digital representation in a first memory, and wherein the step of determining a digital value comprises the steps of:
converting the second amplified signal into a second digital representation, and storing the second digital representation in a second memory,
said method further comprising serially reading the first and second digital representations respectively stored in the first and second memories.

6. An image sensor circuit comprising:

an array of photodetectors, each photodetector having electrical characteristics which vary in response to the intensity of light impinging upon the photodetector;

a plurality of variable amplifiers each coupled to at least one photodetector, for amplifying the electrical characteristics of the photodetectors, each variable amplifier having a gain that depends on the intensity of light impinging upon the photodetector coupled to that variable amplifier; and a plurality of analog-to-digital converters each coupled to at least one variable amplifier, for converting the amplified electrical characteristics into digital values.

7. The image sensor circuit of claim 6, wherein at least one of the variable amplifiers comprises:

a variable amplifier for amplifying the electrical characteristics by a selected one of a plurality of amplification levels, wherein the amplification level is selected by a digital value received from one of the plurality of analog-to-digital converters.

8. An image sensor circuit comprising:

an array of photodetectors, each photodetector having electrical characteristic which vary in response to light impinging upon the photodetector;

a plurality of variable amplifiers each coupled to at least one photodetector, for amplifying the electrical characteristics of the photodetectors; and a plurality of analog-to-digital converters each coupled to at least one variable amplifier, for converting the amplified electrical characteristics into digital values, wherein at least one of the analog-to-digital converters comprises:
a memory for storing a digital value describing the amplified electrical characteristics, and
an output for providing at least a portion of the stored digital value to at least one of the variable amplifiers;
wherein the portion of the digital value provided to the amplifier determines an amount of amplification performed by the variable amplifier.

9. The image sensor circuit of claim 8, wherein the analog-to-digital converter further comprises:

a parallel output for providing the portion of the stored digital value to the variable amplifier in parallel; and a serial output for providing serial access to the stored digital value.

10. A method of converting an optical image into electrical signals, comprising the steps of:

during a first phase:
generating a first electrical signal for a first time interval, wherein the first electrical signal corresponds to a tight intensity;
amplifying the first electrical signal by a first gain amount determined by a first gain selection; and
analyzing the amplified first electrical signal to determine a second gain selection; and during a second phase:
generating a second electrical signal for a second time interval, wherein the second electrical signal corresponds to a light intensity;
amplifying the second electrical signal by a second gain amount determined from the second gain selection; and
analyzing the amplified second electrical signal to determine a value;

wherein the optical image is determined from the second gain selection and the value, and wherein the first time interval is substantially shorter then the second time interval.

* * * * *